Feb. 8, 1938.    J. E. JONES ET AL    2,107,537
TREATMENT OF SOLID MATERIALS WITH LIQUIDS
Filed Jan. 20, 1934
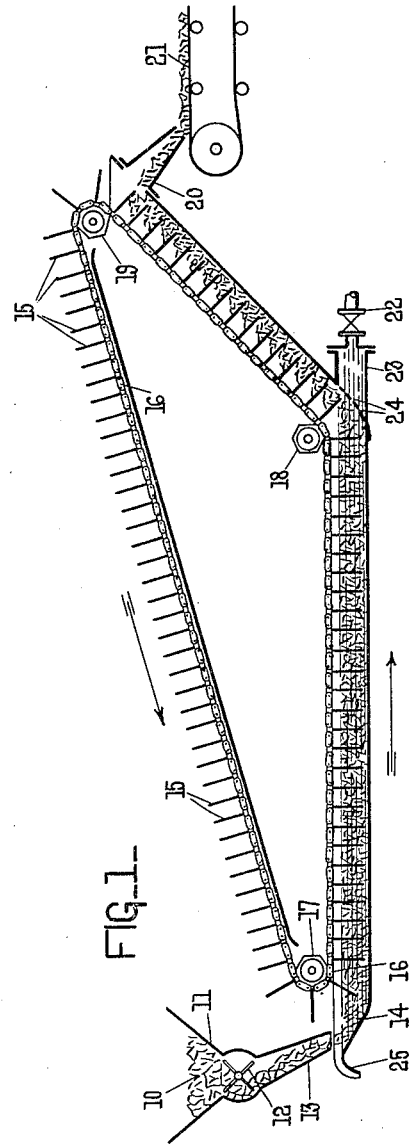
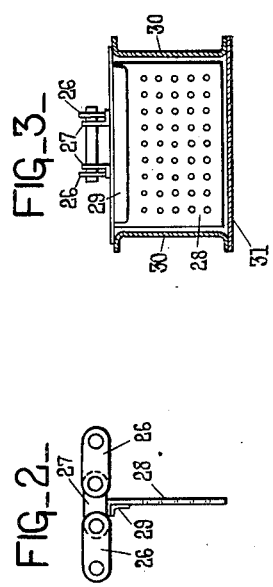
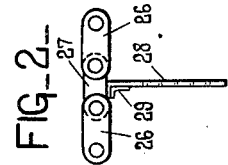
JOHN E. JONES
DAVID R. JOHNSTON
INVENTORS
ATTORNEYS Patented Feb. 8, 1938

2,107,537

UNITED STATES PATENT OFFICE 2,107,537

TREATMENT OF SOLID MATERIALS WITH LIQUIDS

John Edward Jones and David Robert Johnston, Spondon, near Derby, England, assignors to Celanese Corporation of America, a corporation of Delaware Application January 20, 1934, Serial No. 707,504
In Great Britain January 24, 1933

2 Claims. (Cl. 260—102)

This invention relates to the treatment of solid materials with liquids and in particular to processes and apparatus for the continuous treatment of granular or flaky materials with liquid media.

In many manufactures the problem arises of treating solid discrete, e. g. granular or flaky, materials with liquid media in which the bulk of the solid is insoluble, with a view, for example, to removing constituents from the solid material whether by the physical action (as in washing or extraction) or chemical action of the liquid, or to removing constituents from the liquid by the action of the solid, whether with a view to purification of the liquid, recovery therefrom of the substances removed, or impregnation of the solid. In such processes it is of obvious advantage to ensure as intimate a contact as possible between the liquid and the solid. The present invention provides a means whereby this desideratum may be obtained in a continuous process by causing the treating liquid to pass through the solid material while the latter is passing in a counter direction to the liquid.

According to the invention the material is continuously fed into, propelled along, and discharged from, an elongated passage while the treating liquid is continuously introduced into said passage between the feeding and discharge points, and caused to flow therein through the body of moving material in a direction opposite to that of said body.

By this means the liquid is brought into intimate contact with the material to be treated and the treatment is much more effective than if the liquid flowed only, e. g. over the surface of the material instead of through it. The process is applicable with particular advantage to the treatment of materials with liquids of substantially the same or not very different specific gravities. The materials should not be so finely divided that very fine gauzes have to be employed in connection with the propelling members to prevent the materials being carried through said members by the counter current.

Apparatus according to the invention comprises a conduit, means for feeding the material into said conduit near one end, means for discharging the material near the other end, means for introducing a counter-current of treating liquid between the feeding and discharge points, outlet means for said liquid near the feeding point, and a series of perforated propelling members adapted to move in said conduit so as to propel the material from the feeding point to the discharge point while allowing the liquid stream to flow in the opposite direction through the body of the solid material.

We find that a very convenient means of driving the propelling members is to suspend them from one, or in the case of large propelling members between two, parallel endless driven chains, bands or the like. The perforated propelling members may take any form which renders them capable of propelling the solid material while allowing the liquid to pass. They may for example comprise perforated plates or frame structures in which the apertures or interstices are not large enough to allow the solid material to pass, or are covered with wire gauze or other suitable material, mounted in suitable frames.

One form of apparatus according to the invention is illustrated diagrammatically in the accompanying drawing, in which Fig. 1 shows the complete lay-out in part-sectional elevation;

Fig. 2 is a detailed side elevation showing part of the chain and one plate; and Fig. 3 is a front elevation showing the trough, part of the chain and one plate.

In Fig. 1, the material 10 is fed from a hopper 11 by means of a constant feed device 12 through a chute 13 into the open end of a trough 14. The material is carried through this trough in the direction shown by the lower arrow by means of a series of perforated plates 15 depending from a chain 16 passing over chain sprockets 17, 18, and 19 and driven by the last. At the upper end of the run the material is discharged through chute 20 on to a band conveyor 21 which removes it.

The current of treating liquid is introduced through the valve 22 into the extension 23 of the trough, and passes through perforations 24 in the bottom plate of the trough, flows along the trough counter to the direction of motion of the material, and overflows through the pipe 25. Thus during the passage of the material along the horizontal part of the trough it is washed by a counter-current of liquid and during its passage along the inclined portion of the trough excess of the washing liquid is removed and runs back through the perforations in the plate to the horizontal portion of the trough. As shown in the drawing the liquid passes through the whole body of the material.

As illustrated in Figs. 2 and 3, each portion of the chain is built up of pairs of parallel plain links 26 alternating with single intermediate links 27 to each of which is bolted by an angle 29 a perforated plate 28. The face of the angle which is parallel to the intermediate link 27 extends beyond the plate on either side and bears upon the upper flanges of two flanged plates 30 forming the side pieces of the trough, the bottom of which is formed by plates 31. Thus the weight of the propelling plates is borne by these flanges, a slight clearance being left between the bottoms of the said plates and the bottom of the trough.

The process and apparatus of the invention are of particular utility in the manufacture of cellulose acetate and like materials, for example cellulose nitrate, formate, propionate or butyrate. In the manufacture of cellulose acetate, the raw acetate obtained by acetylation, whether or not this has been followed by ripening, contains acetic acid which it is desirable to remove both with a view to recovery of the acid and to purification of the acetate. This removal may very conveniently be effected by means of the process and apparatus of the invention, the raw acetate being continuously fed into, propelled through, and discharged from a counter-current of a liquid capable of dissolving acetic acid but not cellulose acetate. During their passage in opposite directions through the apparatus the liquid becomes progressively richer and the cellulose acetate progressively poorer in acetic acid. As treating liquid in this process we prefer to use water or other aqueous liquids relatively poor in acetic acid.

The application of the process and apparatus of the invention to a chemical treatment of flaky or granular materials by liquid media may also be illustrated by reference to the manufacture of cellulose acetate or the like sustances. Certain processes result in the production of acetates containing small quantities of substances, e. g. sulphuric esters of cellulose, which it is desirable to remove with a view to stabilizing the product. This removal is effected in the so-called stabilizing step which frequently comprises treating the acetate with aqueous solutions containing acid, for example with very dilute aqueous sulphuric acid solutions at temperatures in the neighbourhood of the boiling point. This step may very conveniently be carried out by the process of the invention.

Again, where two or more consecutive processes both involving treatment of the solid material with liquids are involved, e. g. in cellulose acetate manufacture, where washing is followed by stabilization which is followed by a further washing, by applying the principles set out above, the various consecutive steps can be combined to give a continuous process. Cellulose acetate may for example be passed in succession through three units of the type described above arranged in series so that the material fed into the first passes through a counter-current of water or other suitable washing liquid, is fed into the second unit where it passes through a counter-current of hot, very dilute sulphuric acid and thence into the third unit, where it is washed by a counter-current of water and discharged.

What we claim and desire to secure by Letters Patent is:—

1. Process for the treatment of cellulose esters of organic acids in the form of loose granules or flakes or the like and which contain acid employed in the esterification of cellulose to the cellulose esters, which comprises continuously feeding the acid-containing cellulose ester into, positively propelling it along and discharging it from, an elongated passage and causing a counter-current of treating liquid capable of dissolving said acid but unaffecting said cellulose ester to flow continuously through the body of the travelling cellulose ester so as to be in constant contact therewith, whereby the esterification acid is removed from the cellulose ester.

2. Process for the treatment of cellulose acetate in the form of loose granules or flakes or the like and which contain acetic acid employed in the acetylation of cellulose to cellulose acetate, which comprises continuously feeding the acid-containing cellulose acetate into, positively propelling it along and discharging it from, an elongated passage and causing a counter-current of treating liquid capable of dissolving the acetic acid but unaffecting the cellulose acetate to flow continuously through the body of the travelling cellulose acetate so as to be in constant contact therewith, whereby the acetic acid is removed from the cellulose acetate.

JOHN EDWARD JONES.
DAVID ROBERT JOHNSTON.